United States Patent
Gorelik et al.

(10) Patent No.: US 9,904,662 B2
(45) Date of Patent: *Feb. 27, 2018

(54) REAL-TIME AGREEMENT ANALYSIS

(71) Applicant: International Business Machines Corporation, Armonk, NY (US)

(72) Inventors: Leonid Gorelik, Petach Tikva (IL); Abraham Hochmann, Jerusalem (IL); Josemina M. Magdalen, Jerusalem (IL); Alexander Pyasik, Maaleh-Adumim (IL); Yifat Yulevich, Bazra (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/148,087

(22) Filed: May 6, 2016

(65) Prior Publication Data

US 2016/0380971 A1 Dec. 29, 2016

Related U.S. Application Data

(63) Continuation of application No. 14/747,239, filed on Jun. 23, 2015.

(51) Int. Cl.
| | | |
|---|---|---|
| *G06F 17/21* | (2006.01) | |
| *G06Q 10/06* | (2012.01) | |
| *H04L 29/06* | (2006.01) | |

(52) U.S. Cl.
CPC ......... *G06F 17/21* (2013.01); *G06Q 10/0635* (2013.01); *H04L 63/1416* (2013.01); *H04L 63/1483* (2013.01)

(58) Field of Classification Search
CPC ............. H04L 63/0254; H04L 63/1433; H04L 63/1416; H04L 63/1483; G06F 17/21; G06Q 10/0635

(Continued)

(56) References Cited

U.S. PATENT DOCUMENTS

| | | | |
|---|---|---|---|
| 7,702,563 | B2 | 4/2010 | Balson et al. |
| 8,547,356 | B2 | 10/2013 | Maloney et al. |

(Continued)

FOREIGN PATENT DOCUMENTS

| | | |
|---|---|---|
| EP | 1300653 | 4/2003 |
| EP | 1313054 | 5/2003 |

(Continued)

OTHER PUBLICATIONS

Forbes Stop Before You Sign & Get A Good Lawyer Patrick Hull Mar. 7, 2013.*

(Continued)

*Primary Examiner* — Kambiz Zand
*Assistant Examiner* — Benjamin Kaplan
(74) *Attorney, Agent, or Firm* — Reza Sarbakhsh; SVL IPLAW Edell, Shapiro & Finnan, LLC

(57) ABSTRACT

Techniques for informing a user about an agreement including agreement terms and trustworthiness of data source are described herein. In some examples, a processor receives agreement document data while the data is in route to a client device. A system receives network sources and content data of the agreement document. The network sources are to be processed by the processor with traffic analytics, and the content data is to be processed with text analytics. The output of these analytics is used to generate an agreement risk event for delivery to the client device with the original agreement document data.

6 Claims, 6 Drawing Sheets

(58) Field of Classification Search
USPC .......................................................... 726/22
See application file for complete search history.

(56) References Cited

U.S. PATENT DOCUMENTS

| | | | |
|---|---|---|---|
| 8,700,533 | B2 | 4/2014 | Levin et al. |
| 8,794,972 | B2 | 8/2014 | LoPucki |
| 2011/0131114 | A1 | 6/2011 | Ai Mubarak et al. |
| 2012/0296832 | A1 | 11/2012 | Beringer et al. |
| 2013/0265886 | A1* | 10/2013 | Leong ............... H04L 43/10 370/250 |
| 2014/0053069 | A1 | 2/2014 | Yan |
| 2015/0347750 | A1* | 12/2015 | Lietz ............... G06F 21/577 726/23 |
| 2016/0335674 | A1* | 11/2016 | Plourde ............ G06Q 30/0251 |
| 2016/0352589 | A1* | 12/2016 | Zhu .................. H04W 24/10 |
| 2016/0366026 | A1* | 12/2016 | Bartfai-Walcott ..... G06Q 10/06 |

FOREIGN PATENT DOCUMENTS

| | | |
|---|---|---|
| WO | 2009091917 | 7/2009 |
| WO | 2014021811 | 2/2014 |

OTHER PUBLICATIONS

Susan E. Gindin., "Nobody Reads Your Privacy Policy or Online Contract? Lessons Learned and Questions Raised by the FTC's Action Against Sears", Northwestern Journal of Technology and Intellectual Property,vol. 8, Issue 1 Fall, Article 1, Fall 2009.

"License Analyzer", http://www.spywareguide.com/analyze/analyzer.php, SpywareGuide, 2003, 1 page.

"License Analyzer", License Dashboard Limited, 2012, 2 pages.

"LicenseAnalyzer", Open iT, Inc, 2014, 2 pages.

"EULAlyzer: Analyze license agreements for interesting words and phrases. Make sense of the nonsensical", BrightFort Products: EULAlyzer, BrightFort LLC, 2002-2012, 1 page.

"ktMINE Announces the Launch of License Agreement Analyzer™", http://www.ktmine.com/ktmine-announces-launch-license-agreement-analyze/, Sep. 18, 2012, 2 pages.

List of IBM Patents or Patent Applications Treated as Related, May 2016, 1 page.

* cited by examiner

100

```
<AgreementLoyaltyEvent>
    <OriginSystem>
        <name="IBMAgreementAnalysisStreamingPlatform"/>
        <location="IBM Haifa Research Lab"/>
    </OriginSystem>
    <AgreementDataEvent>
        <AgreementSourceMetadata>
            <domainName >foo.com</domainName>
            <protocol >HTTP </protocol>
            <domainTrustLevel>35%<domainTrustLevel>
        </AgreementSourceMetadata>
        <AgreementContentData>
            <CommitmentPeriod>24 month</commitmentPeriod>
            <paymentCommitment>25 US Dollars</paymentCommitment>
            <products> magic tea for a weight loss </products>
            <vendor>jw.com</vendor>
        </AgreementContentData>
    </ AgreementDataEvent>
<AgreementLoyaltyEvent>
```

REAL-TIME AGREEMENT ANALYSIS

CROSS-REFERENCE TO RELATED APPLICATIONS

This application is a continuation of U.S. patent application Ser. No. 14/747,239, entitled "Real-Time Agreement Analysis" and filed Jun. 23, 2015, the disclosure of which is incorporated herein by reference in its entirety.

BACKGROUND

One common method of fraud on the internet is to entice customers to sign up for "risk free" product trials through a sham website, and then charge their credit cards by recurring pay order for services described in hard to read text. Fraudulent or deceptive online behavior affects business organizations as well as individuals. In some cases, there is a concern of vulnerability through the automatic signing of an agreement with unobserved "small print" and terms by an organizational employee. Even with policies in place, ineffective enforcement of these policies can result in organizations risking the use of licenses illegally for commercial purposes, and risking agreement to unknown terms, as well as the risk of corporate reputation.

SUMMARY

According to an embodiment described herein, a system for informing a user about an agreement comprises a processor that can receive agreement document data while the agreement document data is in route to a client device. The processor can also generate traffic analytics data based on network sources corresponding to the agreement document data. Furthermore, the processor can generate text analytics data based on content data corresponding to the agreement document data. The processor can also generate an agreement risk event based on the traffic analytics data and the text analytics data for transmitting to the client device with the agreement document data.

According to another embodiment described herein, a method for informing a user about an agreement comprises receiving, via a processor, agreement document data while the data is in route to a client device. The method also can include analyzing, via the processor, network sources of the agreement document by executing traffic analytics. Furthermore, the method can include analyzing, via the processor, content data of the agreement document by executing text analytics. The method also can include generating, via the processor, an agreement risk event from data output after traffic analytics and text analytics for delivery to the client device with the agreement document data.

According to yet another embodiment described herein, a non-transitory computer readable storage medium can have program instructions embodied therewith, the program instructions executable by a processor. The processor can receive agreement document data at a processing platform while the data is in route to a client device. The processor can also analyze network sources of the agreement document with traffic analytics. Furthermore, the processor can analyze content data of the agreement document with text analytics. The processor can also generate an agreement risk event from data output by the traffic analytics and the text analytics for delivery to the client device along with the agreement document data.

BRIEF DESCRIPTION OF THE DRAWINGS

FIG. 4 depicts an example of the structure of an agreement analysis event to be communicated to a client device;

DETAILED DESCRIPTION

Currently, if a user is browsing a site and decides to download software with an agreement, the presentation of these agreement terms are often accompanied by confusing checkboxes, large blocks of legalese text, deceptively small print, or outright fabrications. A few methods of protection currently use manual intervention by a user to find the proper analysis tools and involve a user copying the agreement document to these services after already being agreed to or downloaded to the client device.

The present invention embodiments relates to warning a user, and more specifically, but not exclusively, to warning a user to the terms and source of an online or software agreement in real-time. A real-time processing application generates data insights or analysis results, instantaneously upon data entry or receipt, and can be implemented using technologies such as stream processing, active databases, continuous query systems, publish subscribe systems, complex event processing and other similar technologies and systems. In the present application, various terms and questionable data sources are detected on a unified processing scheme. In some examples, the questionable data sources can be detected in a streaming environment. Further, this detection provides a warning to the user as the user is considering the agreement rather than after such an agreement is accepted by the user. Further, the real-time analysis of the agreement allows correlation to a group wide policy, for example a company policy against certain agreement terms or sources of online software.

The detection methods described herein make use of streaming analytics techniques to analyze both the text of the agreement document and the source of the agreement document simultaneously. The information derived from the streaming analytics is used to generate an agreement risk event that is sent to the client device. This agreement risk event can identify not only relevant terms of the agreement, but can also warn the user of the source of the agreement and a level of security and authenticity that can be expected with the agreement. The client device can be used by a single user, or can be monitored by a group wide policy that may correlate the agreement risk event to a policy to determine compliance. A client device can also use the agreement risk event to display a warning to a user or to block a user from accepting an agreement completely or at least until certain precautions and verifications are undertaken.

Figure 1:
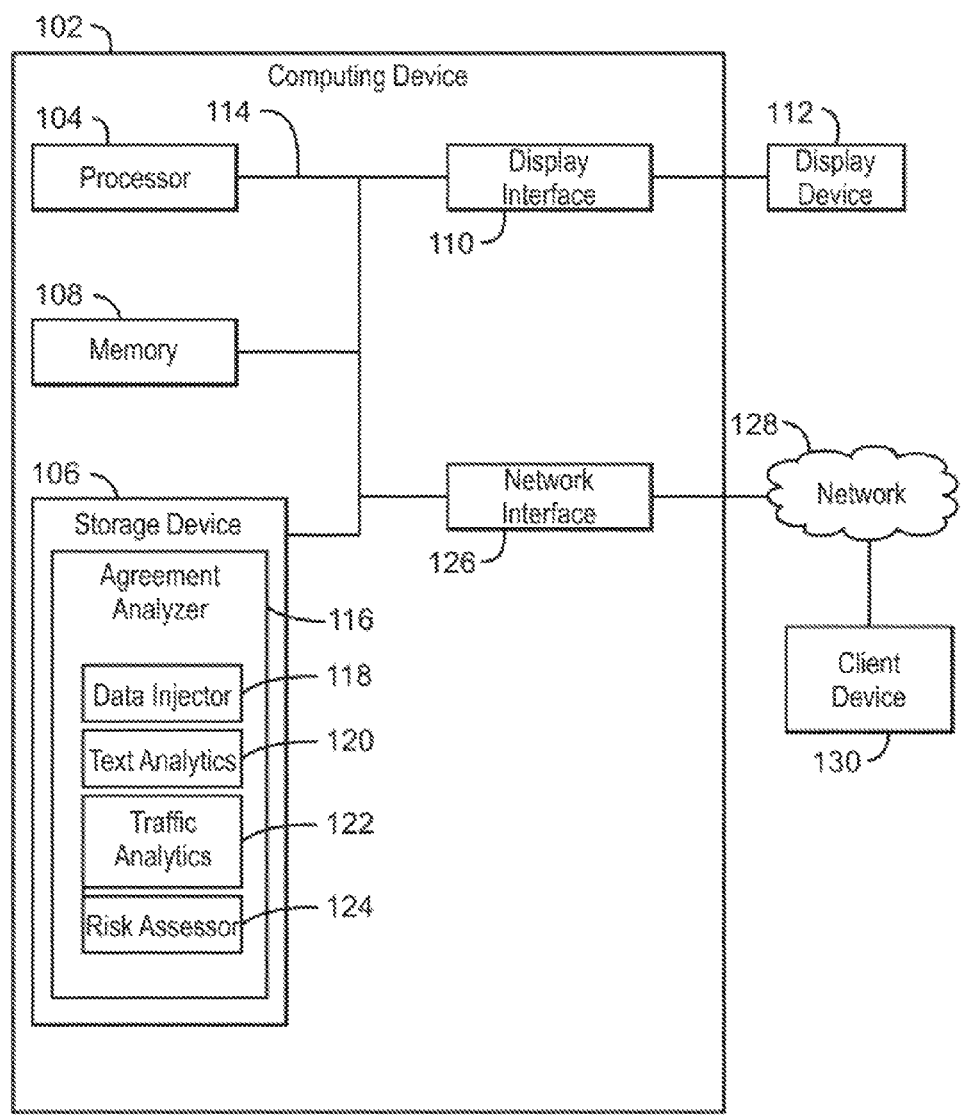
FIG. 1 depicts a block diagram of an example streaming analytics system used to analyze an agreement in a data stream.

FIG. 1 depicts a block diagram of an example streaming analytics system 100 used to analyze an agreement in a data stream. The streaming analytics system 100 may include a computing device 102 having a processor 104, a storage device 106 comprising a non-transitory computer-readable medium, a memory 108, a display interface 110 communicatively coupled to a display device 112. In order to analyze an agreement in a data stream, in some examples, the data of an agreement is delivered only to the computing device 102 prior to delivery to a target computer or client. In another example, the data of an agreement is delivered to the computing device 102 at the same time the same data is being delivered to the target or client. As outlined below, the computing device 102 can analyze the data of an agreement as the agreement data is streaming in to a requesting device and provide information to the requesting device prior to an acceptance or declining of an agreement.

The processor 104 may be adapted to execute the stored instructions. The processor 104 may be a single core processor, a multi-core processor, a computing cluster, or any number of other configurations. The memory 108 can include random access memory, read only memory, flash memory, or any other suitable memory systems. The processor 104 may be connected by a system bus 114 to components including the memory 108, the storage device 106, and the display interface 110. The display device 112 may be an external component to the computing device 102, an integrated component of the computing device 102, or any combination thereof.

The storage device 106 may include an agreement analyzer 116 to generate agreement risk event. The agreement analyzer 116 may make use of a data injector 118, text analytics 120, traffic analytics 122, and a risk assessor 124. These are more fully explained in FIG. 2, seen below, and each can contribute to an agreement analyzer 116 generating an agreement risk event.

The computing device 102 may include a network interface 126 to communicatively couple the computing device 102 to a network 128. In an example, the network interface 126 may receive traffic data such as a network source or several network sources and content data from the network 128. The agreement analyzer 116 can use the data received by the network interface 126 to generate the agreement risk event.

A network may also be commutatively connected to a client device 130. The client device may be similar to the computing device 102 and in some cases the client device 130 and the computing device 102 may in fact be the same device. The client device 130 is shown as separate here to illustrate that the client device 130 may be remote and separate from the computing device 102. The client device 130 can be the device where the agreement or software is installed or implemented.

In some examples the agreement document is streamed from the network 128 to the network interface 126 and analyzed in a data stream at the agreement analyzer 116. Based on the agreement risk event generated, an alert, command, or warning may be sent to the client device 130 to arrive before the agreement document has been executed on the client device 130 by a user.

The block diagram of FIG. 1 is not intended to indicate that the computing device 102 is to include all of the components shown in FIG. 1. Further, the computing device 102 may include any number of additional components not shown in FIG. 1, depending on the details of the specific implementation.

Figure 2:
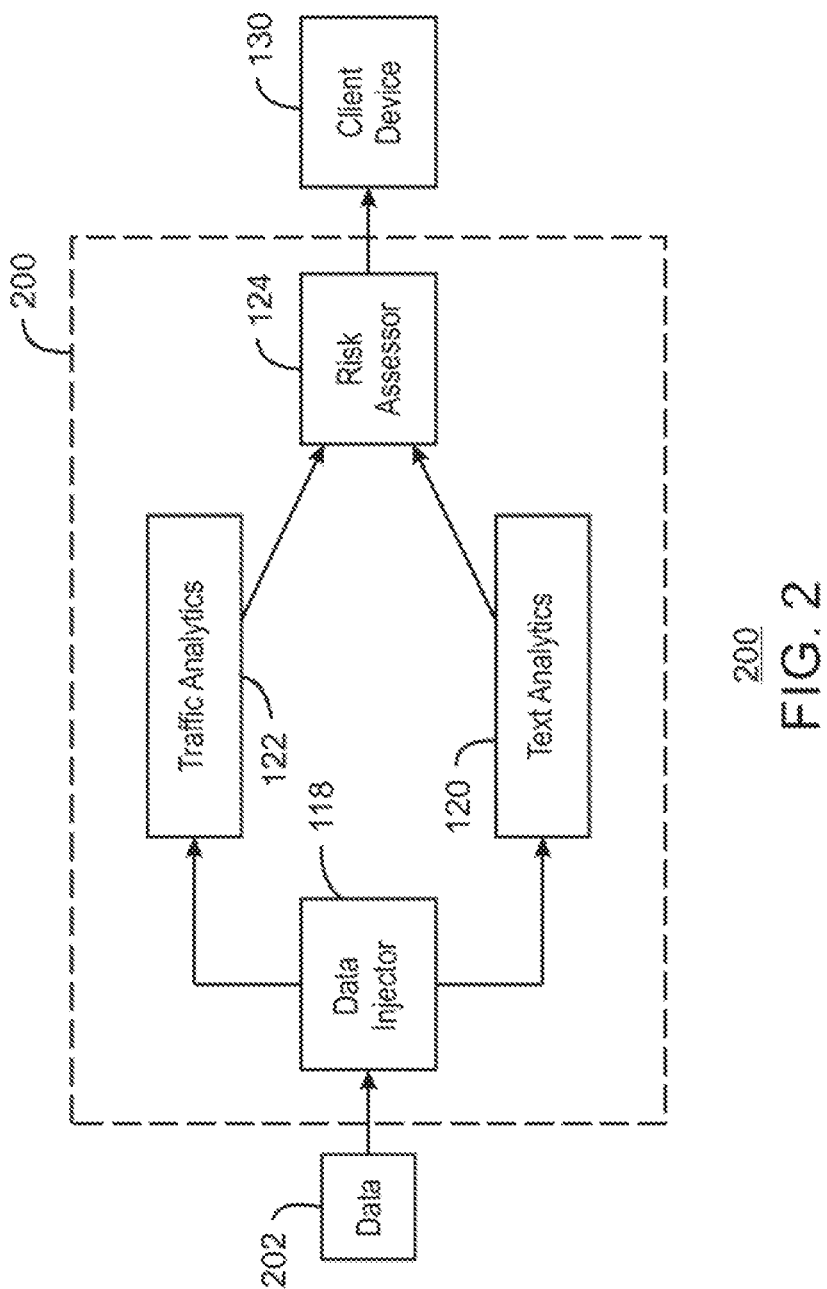
FIG. 2 depicts a block diagram of an example data processing flow and agreement analysis architecture.

FIG. 2 depicts a block diagram of an example data processing flow and agreement analysis architecture 200. In some examples the agreement can be a contract formed over a piece of software or service that is being installed or sent to a particular device. The agreement analysis shown in this figure takes incoming data 202 related to agreements of this kind and provides an analysis of the risk to the user and sends that analysis to a client device 130.

The incoming data 202 can be included in one or more streams of data from any suitable number of applications. The data 202 can include incoming Hyper Text Transfer Protocol (HTTP) data, Dynamic Host Configuration Protocol (DHCP) data, Domain Name System (DNS) data, Netflow data, and other suitable data formats related to an agreement document and network traffic of the data about the agreement.

The data 202 may stream into an agreement analysis architecture 200 that is taking place in a computing device 102 as described in FIG. 1 or in any other suitable computing device. In some examples, the data 202 is received by a data injector 118. The data injector 118 may be an application, a piece of hardware, or instructions implemented by a processor 104. The data injector 118 is responsible for receiving and filtering data 202 as well as the initial formatting and relevant session reconstruction. The data injector 118 can be used to handle multiple formats of data 202 including those listed above.

Text analytics 120 can be an application, hardware, instructions implemented on data in a processor 104, or may be other suitable computation techniques. The content data including text data is also derived from the data 202 originally received by the data injector 118. Text analytics 120 can obtain the text of an agreement, and decipher the terms through a variety of techniques including phrase matching, comparison to agreement databases, and other suitable machine learning techniques. In one example, language phrasing, a grouping of words from the text, is compared to a phrasing data source. The phrasing data source may store key phrases that identify a document or similarities to a known document to identify the subject matter, source of the text, and other useful data for analysis. Based on a comparison of linguistic concepts to linguistic concepts identified in the data source texts, a linguistic profile, matching status, and a set of agreement specific characteristics can be determined. A linguistic concept can include sematic units such as a word, expression, or a conceptual token bearing a certain notion or construct. A matching status can indicate if the linguistic concepts of the agreement are similar to any of the linguistic concepts in the data source. A linguistic profile can indicate statistical information associated with linguistic concepts in the data source.

Additional details for example analytical steps and processes of the text analytics 120 are found below in FIG. 3. The output of the text analytics 120 includes specific agreement terms including end-user commitment period, end-user payment commitments, products and services covered by the agreement, identifying information about the vendor responsible for the products or services being rendered, or other similar output terms that can be found in an agreement.

Traffic analytics 122 can be an application, hardware, instructions implemented on data in a processor 104, or may be other suitable computation techniques. Network traffic data derived from the data 202 including network sources, may be analyzed by traffic analytics to identify a source of an agreement and the behavioral patterns of the data. In some examples, traffic analytics 122 can analyze behavioral patterns of data 202 for domains and sites containing agreement content based on DNS and HTTP traffic, and other types of traffic. In some examples, traffic analytics 122 can utilize Netflow and DHCP traffic to determine other machines in the enterprise network that potentially were involved in a similar kind of agreement activities against the problematic agreement sites.

The output of both the text analytics 120 and the traffic analytics 122 are sent to the risk assessor 124. The risk assessor 124 can generate an agreement risk event from the inputs of the analytics and can be an application, hardware, instructions implemented on data in a processor 104, or may be other suitable computation techniques. The agreement risk event generated by the risk assessor 124 can be sent to the client device 130 using a data format such as AgreementLoyaltyFormat (ALF), among others. ALF consists of an origin system that identifies the source of the message. ALF also includes an Agreement Data Event to describe the agreement data and metadata event to be communicated to the client based on analysis by both traffic analytics 122 and text analytics 120. Additional details about the ALF can be found in FIG. 4. The client device 130 receiving the agreement risk event can use the both the event and the origin source to properly warn a user or correlate the agreement to a group wide policy to confirm compliance.

Figure 3:
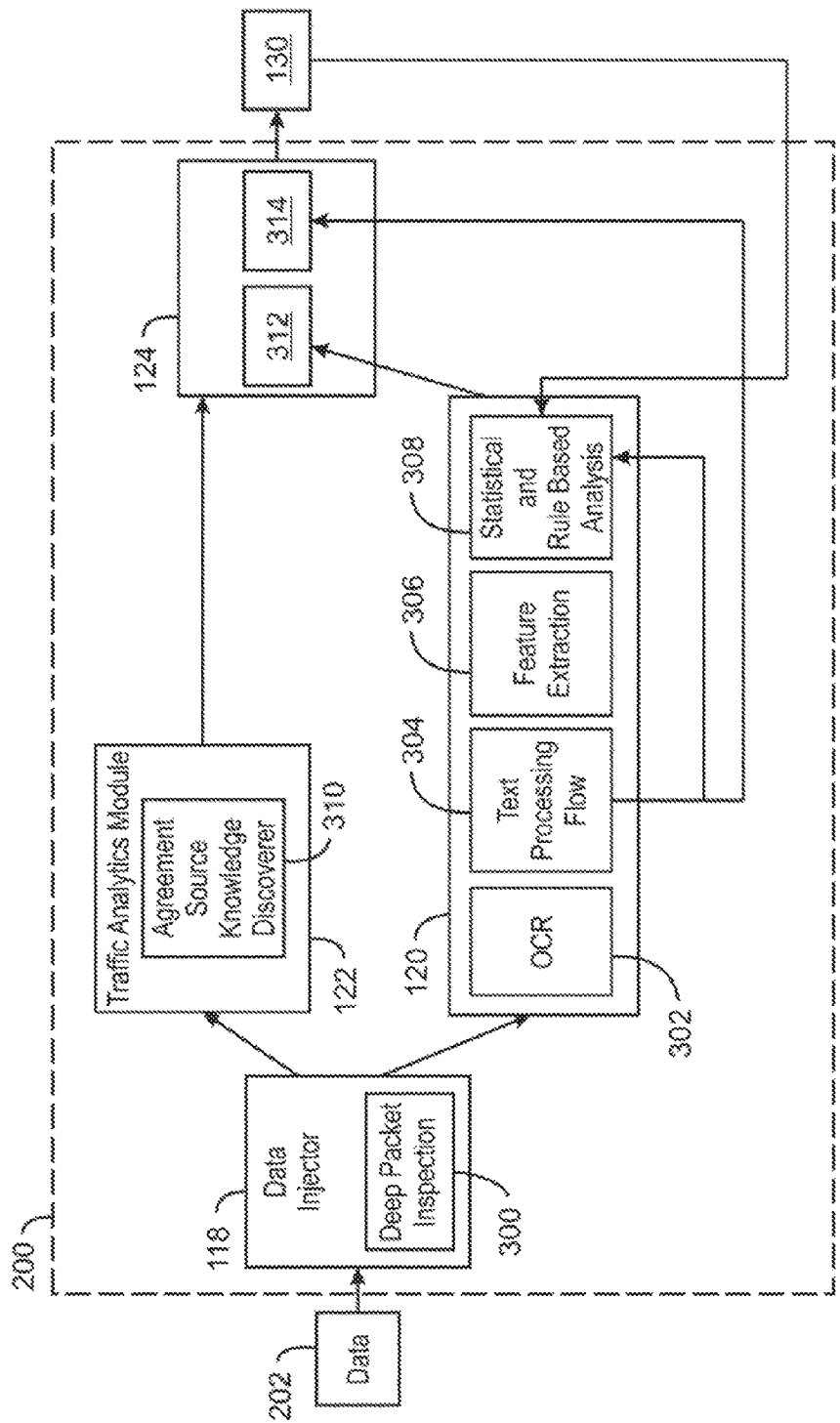
FIG. 3 depicts a block diagram of a detailed model of agreement analysis mechanisms.

FIG. 3 depicts a block diagram of a detailed architecture 300 of agreement analysis mechanisms. Like numbered items are as described in FIG. 2.

As discussed above, the data injector 118 may perform initial raw data formatting or session reconstruction. As part of the initial raw data formatting, filtering and session reconstruction, the data injector 118 may perform deep packet inspection (DPI) 300 to provide normalized session data. In some examples, the DPI 300 performed by the data injector 118 provides normalized session data to two streaming applications running independently and in parallel: traffic analysis and text analysis. In some examples, normalized session data is data that has been received during a computing session, including any information exchange between two or more computing devices, and then organized and formatted to provide a uniform structure to session data when compared to databases or other session data sets.

As discussed above, the text analytics 120 may perform analysis of the content of the agreement. As part of that, text analytics 120 can include an optical character recognition (OCR) component 302. In some examples, the agreement document provided as data 202, or to the end-user or client device 130 is in the form of scanned documents. This format can make it difficult for the analytics and the end-user to run simple techniques like "copy" and "paste" on the text of an agreement document. The OCR component 302 resolves this issue by conversion of scanned or photographed agreement images into machine-encoded and computer-readable text.

An agreement text processing flow component 304 can run common text analytics techniques on a license agreement text generated by the OCR component 302. These results may be used later on in feature vector generation. In some examples, the text processing flow component 304 performs analysis actions on the agreement text including, language identification, sentence segmentation, tokenization, case normalization, lemmatization, part-of-speech tagging, named entity extraction, phrase recognition, or any other similar text analysis technique.

In some examples, text analysis uses an unstructured information management architecture (UIMA) based annotator or a similar available infrastructure to identify License/legal specific phrases and entities (see the example below) performing a shallow parsing. In some cases, shallow parsing is an analysis of a sentence which identifies the constituents (e.g. noun groups, verbs, verb groups, etc.), but does not specify their internal structure, nor their role in the main sentence. As a result of the annotations, potentially relevant parts of the text can be identified and gathered into a summarization or short abstract that can be presented to the user along with the highlighting of important phrases in the text. An abstract with the highlighted terms could help the user to be aware of the main claims, as specified by a user, of an agreement in a quick and convenient way by reading this abstract. If a user does not identify what they consider to be the main claims of an agreement, a default could be set, for example, as any financial commitment, the duration of that commitment, the duration of the license, the type of transaction (e.g. license, sale, etc.), and the parties to be bound.

A feature extraction component 306 can use the data provided by the agreement text processing flow component 304 to generate a feature vector. In some examples, the feature vector can include a match between the site and license agreement language. In some examples, the feature vector can include the number of entities that usually characterize a license agreement in a specified language. In some examples, the feature vector can include a number of phrases that characterize license agreements in a specified language. In some examples, a feature vector can include license agreement specific characteristics according to the agreement text. As discussed above, these agreement specific characteristics can include end-user commitment period, end-user payment commitments, products and services covered by the agreement, an identification of the vendor responsible for the products and services supply, or other suitable characteristics.

The statistical and rule based analysis component 308 may use the feature vector generated by the feature extraction component 306 as an input. Additionally, the statistical and rule based analysis component 308 can apply normalizing rules on entities and phrases originally detected by the agreement text processing flow component 304. These normalizing rules can prepare the data 202 for processing by in the risk assessor 124. In addition, a statistical model can be applied on a feature vector generated by the feature extraction component. It is understood that the analytics components shown here are only examples and additional analysis components can be included. For example, as analytics technology develops, advanced analytics components may be included as extra steps in this real-time analysis, and more specifically in the text analytics 120 shown.

The traffic analytics 122 can include an agreement source knowledge discoverer 310. The agreement source knowledge discoverer 310 can be an application, hardware, or instructions executed on a processor 104. As discussed above, traffic analytics 122 receives normalized data 202, including DNS, HTTP, Netflow and DHCP packets and sessions as an input. The agreement source knowledge discoverer 310 can use this data 202 for streaming analytics. The agreement source knowledge discoverer 310 may apply streaming knowledge discovery steps including raw data correlation, and aggregation, filtering and enrichment, traffic feature extraction, and mining.

Correlation and aggregation are steps applied by the agreement source knowledge discoverer 310 that includes correlation and aggregation of data from different traffic sources into a comprehensive document source view. For example, when a client device initiates communication with a source destination, such as a website, among others, that contains an agreement document, the client device may resolve the site name using DNS and then start to communicate with the site using HTTP protocol. During this stage, DNS and HTTP sessions can be correlated by client internet protocol (IP) or media access control (MAC) address and may be used later on for a single feature generation that combines DNS and HTTP data.

Filtering and enrichment are steps applied by the agreement source knowledge discoverer 310 and can include raw network data noise filtering and non-filtered data enrichment. For example, IP addresses returned as a result of domain name resolution by DNS server can be enriched with geospatial information. This can reveal potentially suspicious information such as a large number of unique countries in a DNS response or IP addresses belonging to suspicious countries tracked with Netflow.

Traffic feature extraction is a step applied by the agreement source knowledge discoverer 310 that can include execution of heuristics for selecting specific features from enriched data. For example, in the context of license domain analysis, the country distribution of domain IP addresses could be run against n-gram based domain name analysis to understand if the distribution is machine generated. This analysis may also check if the domain was contacted directly, or to confirm that it is without its resolution through DNS server.

Mining is a potential step applied by the agreement source knowledge discoverer 310 that can include knowledge discovery algorithms and other methods used for identifying patterns in the data, for identifying similarity and groupings, for partitioning the data into well-defined classes, for fitting different mathematical functions to the data, for identifying common dependencies and correlations, or for identifying abnormal or anomalous data.

Each of these steps may be applied by the agreement source knowledge discoverer 310 to prepare the networking traffic data, such as network sources, for use by the risk assessor 124. As part of the risk assessor 124, a correlated label component 312 can receive as an input the output of the text analytics 120 and the traffic analytics 122. The correlated label component 312 can implement instructions on a processor 104 to evaluate a correlated label for the agreement document. For example, assume the result of the traffic analytics 122 comes with a high confidence indication that the agreement document comes from a malicious domain or website. In this case, the correlated label component would output an indication that the agreement document is suspicious for the given agreement document even if the result of the text analytics 120 indicates a benign agreement document with high confidence. The correlating label component 312 would likewise overrule a benign output from the traffic analytics 122 if the output of the text analytics 120 came back as suspicious with high confidence.

The risk evaluator component 314 received two inputs including both the correlated label component 312 and characteristics extracted from the agreement by text analytics component 306. The risk evaluator sends both of these inputs to the client device or end-user browser. Once this information is received by the client device 130, the result of the user's evaluation of the agreement can be sent back to the statistical and rule based analysis component 308 for statistical model training and policy update.

FIG. 4 depicts an example of the structure of an agreement analysis event to be communicated to a client device. The method 400 can be implemented with any suitable computing device, such as the computing device 102 of FIG. 1 and through the architectures discussed in FIG. 2 and FIG. 3.

In previous figures, the result of streaming agreement analytics includes delivering an agreement risk event to a client device 102. Generally, this risk event can include key terms and an analysis of the traffic source for safety and trustworthiness. This information can be displayed to a user or correlated to a group policy implemented within a network to determine compliance with the policy. In some examples, if no compliance is found, the policy may restrict or prohibit the user from accepting the agreement based on the terms, the traffic source, or other criteria.

This information in the risk event can include an agreement loyalty event (ALE) 400 to convey this information. The example agreement loyalty event 400 shown in FIG. 4 can be presented in ALF format and can contain critical data and metadata about an agreement. In some examples, ALE 400 attributes can be divided to two groups: agreement source and agreement content.

The agreement source and source metadata group can include agreement source URL, domain name, protocol, and domain trust level. The domain name can be the name of the domain where the agreement is published. The protocol can include the protocol used for an agreement source domain analysis. The domain trust level can include a numeric domain trust level. The numeric trust level may be populated by the agreement source knowledge discoverer 310 discussed above. The agreement content data can include an end-user commitment period, end-user payment commitments, products and services covered by the agreement, and an identification of the vendor responsible for the products and services supply.

The present invention may be a system, a method, and/or a computer program product. The computer program product may include a computer readable storage medium (or media) having computer readable program instructions thereon for causing a processor 104 to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor 104 of a general purpose computer, special purpose computer, or other programmable data processing apparatus to produce a machine, such that the instructions, which execute via the processor 104 of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
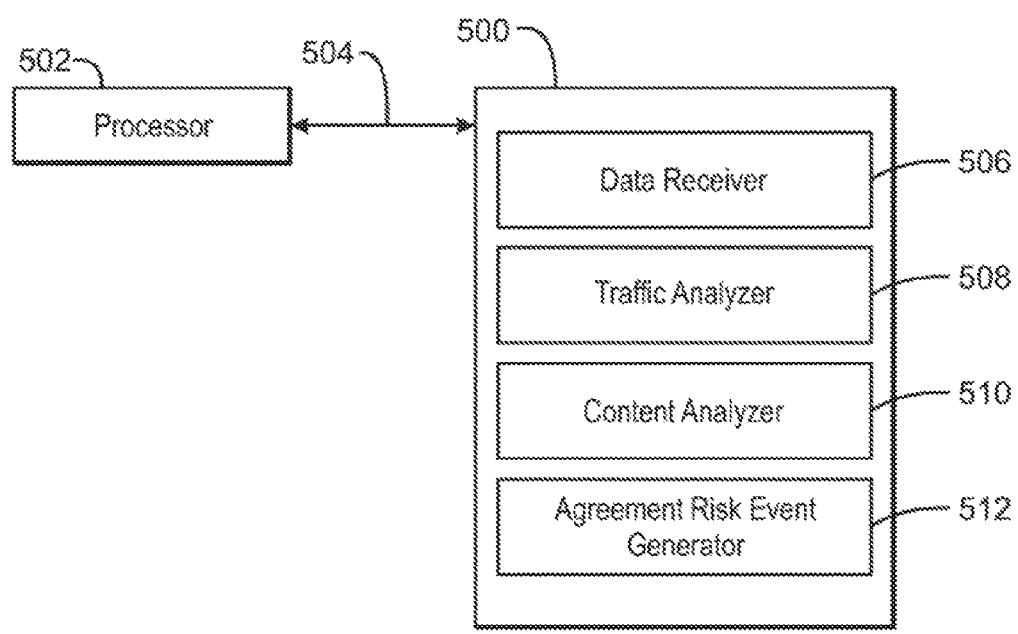
FIG. 5 is a tangible, non-transitory computer-readable medium that can generate an agreement risk event from agreement document data.

FIG. 5 is a tangible, non-transitory computer-readable medium that can generate an agreement risk event from agreement document data. The tangible, non-transitory, computer-readable medium 500 may be accessed by a processor 502 over a computer interconnect 504. Furthermore, the tangible, non-transitory, computer-readable medium 500 may include code to direct the processor 502 to perform the operations of the current method and techniques herein disclosed.

The various software components discussed herein can be stored on the tangible, non-transitory, computer-readable medium 500, as indicated in FIG. 5. For example, a data receiver 506 can, as part of the computer-readable medium receive data including content data and traffic data from an agreement document as it is streaming to the client device.

Further, a traffic analyzer 508 analyzes network sources received by the data receiver 506 using traffic analysis techniques as described above in FIG. 3. This analysis can occur as the traffic data is streaming in and as it is being received by the data receiver 506. A content analyzer 510 analyzes content data received by the data receiver 506 using content and text analysis techniques as described above in FIG. 3. This analysis can occur as the content data is streaming in and as it is being received by the data receiver 506.

An agreement risk event generator 512 uses the output of the traffic analyzer 508 and content analyzer 510 to create an agreement risk event. This file may be delivered via the computer interconnect 504 to a client device such as the computing device 102 of FIG. 1. The generated agreement risk event can be delivered to the client device at the almost same time the agreement document is being delivered to the client device, and certainly prior to a user being able to accept the underlying agreement. This is one way the analysis appears to occur on a data stream prior to the user's ability to accept an agreement. For example, the analysis by the traffic analyzer 508 and content analyzer 510 can take place during delivery of the agreement document to the client device where a user may view it. Prior to user acceptance of the agreement, the agreement event generator 512 can deliver the agreement risk event to the client device to warn the user. This warning may include an indication of the various terms as well as the security and reputation of the source of the underlying download or software being covered in the agreement.

It is to be understood that any number of additional software components not shown in FIG. 5 may be included within the tangible, non-transitory, computer-readable medium 500, depending on the specific application.

Figure 6:
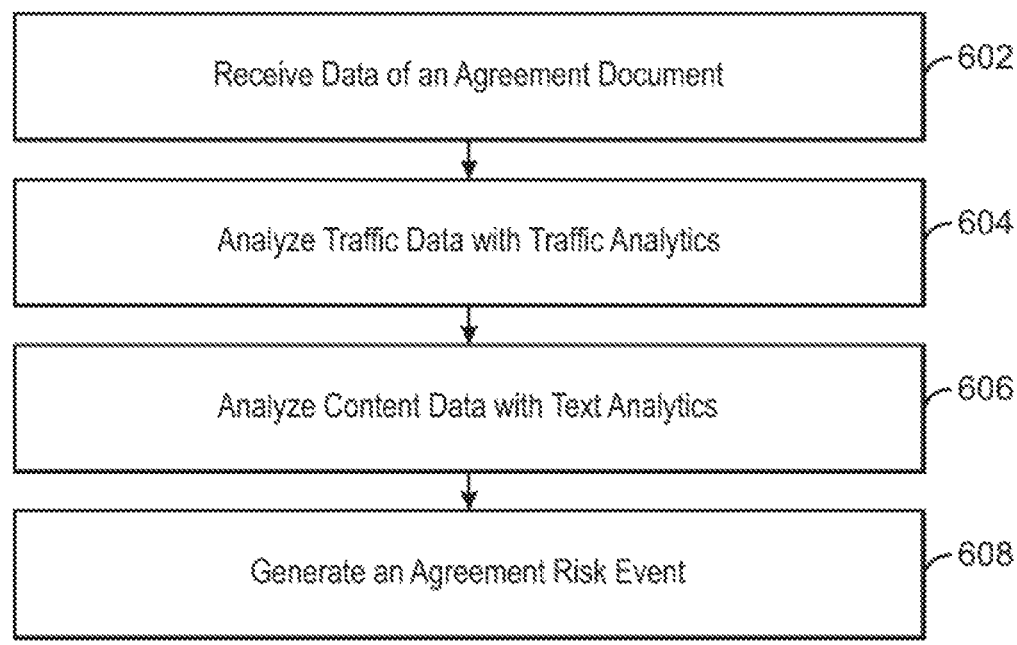
FIG. 6 is a process flow diagram of an example method for analyzing a document in real-time.

FIG. 6 is a process flow diagram of an example method for analyzing a document in real-time. This method may be implemented on a computing device 102 or architectures as shown in FIGS. 1, 2, and 3. Each agreement document can include "small print" that can hide the intent and terms of an agreement. "Small print" itself can be a term of law, a matter in a contract, or other text printed in small type, especially when considered to be a trap for the unwary. Similar problems arise with overly detailed wording of a contract or lease where these terms are often in a type or font smaller than the main body of the document. Small print can include restrictions or qualifications that could be considered disadvantageous to a user.

At block 602, a computing device 102 receives agreement document data while the agreement document data is being transmitted (or is in route) from a source destination to a client device. The source destination can include any suitable computing device that hosts the agreement document data. For example, the source destination can include a web server that hosts a website, among others. In some examples, the computing device 102 intercepts the agreement document data as the agreement document data is transmitted from the source destination to the client device. In some examples, the computing device 102, resides between the source of the agreement data, e.g. in a network 128 and the client device 130. As discussed above, the agreement document data can include information pertaining to a webpage, a document, and the like. In some embodiments, the network interface 126 can receive raw HTTP network packets, or any other suitable network packets, and then a data injector 118 can aggregate the received network packets to generate or reconstruct a single license document. In some examples, the data injector 118 can use any suitable streaming technique to aggregate network packets to form portions of the license document during the transmission of the entire license document.

At block 604, traffic analytics 122 analyzes traffic data corresponding to the agreement document to generate traffic analytics data. In some embodiments, traffic analytics 122 uses any suitable traffics analytics technique to analyze the traffic data. For example, an agreement analyzer 116 can use traffic analytics 122 to analyze the data and metadata of the traffic of the HTTP network packets corresponding to the agreement document data. In some examples, low-level traffic data can include data from a network layer or the third level in an OSI model. Traffic analytics 122 may analyze any data from the network layer to the presentation layer, or the sixth level in OSI modeling. This data could come from the same originally received HTTP traffic of the agreement document. The traffic analytics 122 may be used to detect a level of confidence for the severity of threat if the traffic comes from a malicious domain.

At block 606, content data is analyzed with text analytics 120. As discussed above, text analytics 120 can apply a number of techniques on an agreement document text or text generated by OCR component from the agreement document data. The result of text analytics 120 can be used later through direct display to a user on a display device 112 and also in up-stream feature extraction for feature vector generation.

At block 608, a risk assessor 124 generates an agreement risk event for delivery to a client device 130. The agreement risk event may be used by the client device 130 to warn a user deciding whether or not to accept an agreement. The agreement risk event information transmitted to the client device 130 can, in some examples, be correlated to a network wide policy. In other examples, the information from the agreement risk event can be tailored to a specific user profile that has preset specifications about which agreements the user may accept or may not accept. In another example, the information from the agreement risk event can include the trustworthiness of the origin source of the agreement data and the key terms of the agreement. In one example, based on the information from the agreement risk event, the computing device 102 can block the transmission of the agreement document data in response to detecting a warning based on the risk event. In another example, agreement risk event may be used by a computing device 102 to monitor a response from a client device 130 and can block outgoing transmission of data corresponding to the acceptance of the agreement document.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for informing a user about an agreement comprising:
    receiving, via a processor, agreement document data while the agreement document data is in route to a client device;
    analyzing, via the processor, network sources of the agreement document by executing traffic analytics;
    analyzing, via the processor, content data of the agreement document by executing text analytics;
    generating, via the processor, an agreement risk event from data output after traffic analytics and text analytics for delivery to the client device with the agreement document data; and
    blocking, via the processor, a user from accepting the agreement based on the agreement risk event, wherein the blocking of the user from accepting the agreement further comprises:
       blocking an outgoing transmission of data corresponding to an acceptance of the agreement.

2. The method of claim 1, wherein the agreement document data includes a raw packet of network data and wherein the receiving the agreement document includes receiving the packet and reconstructing a single agreement document using deep packet inspection before sending the packet to traffic analytics and text analytics.

3. The method of claim 1, wherein the processor uses streaming techniques to analyze the incoming agreement document data as it is received.

4. The method of claim 1, wherein the traffic analytics and the text analytics are weighted differently when used to generate the agreement risk event based on confidence associated with each of the traffic analytics and the text analytics, respectively.

5. The method of claim 1, wherein the agreement risk event comprises:
   origin system information to identify a source of the agreement document data; and
   agreement data event information to describe an agreement data event and a meta-data event to be communicated to the client device.

6. The method of claim 1, wherein the blocking of the user from accepting the agreement further comprises:
   blocking the user from accepting the agreement until certain precautions and verifications are undertaken.

\* \* \* \* \*